UNITED STATES PATENT OFFICE.

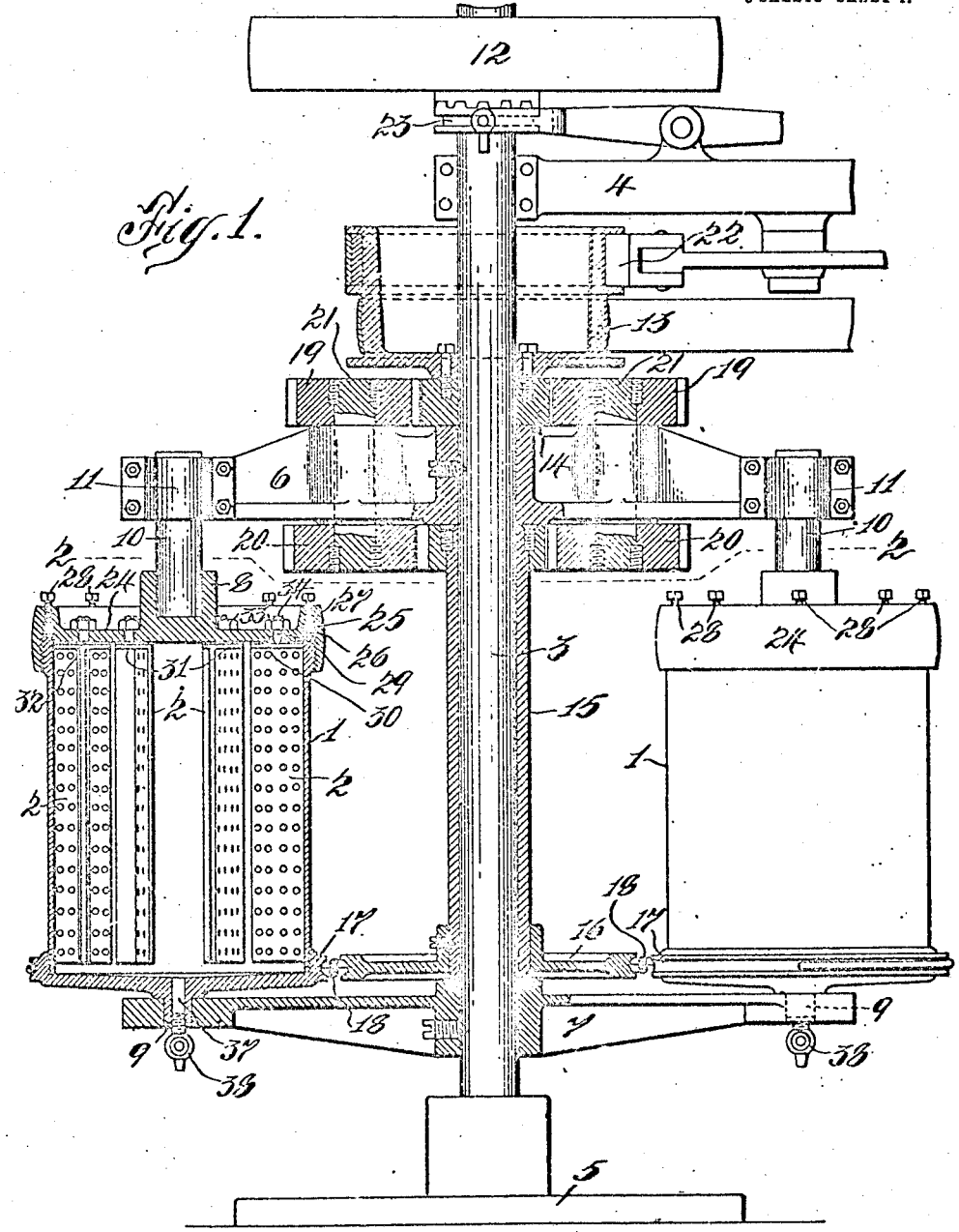

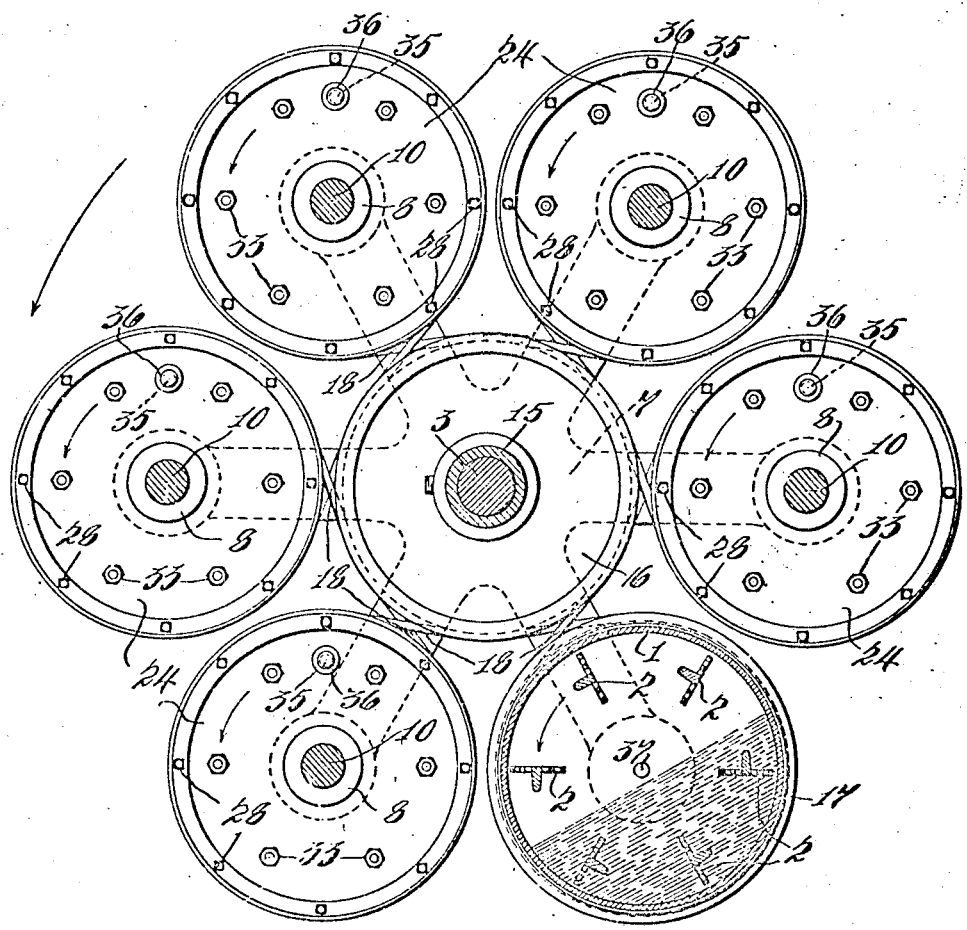

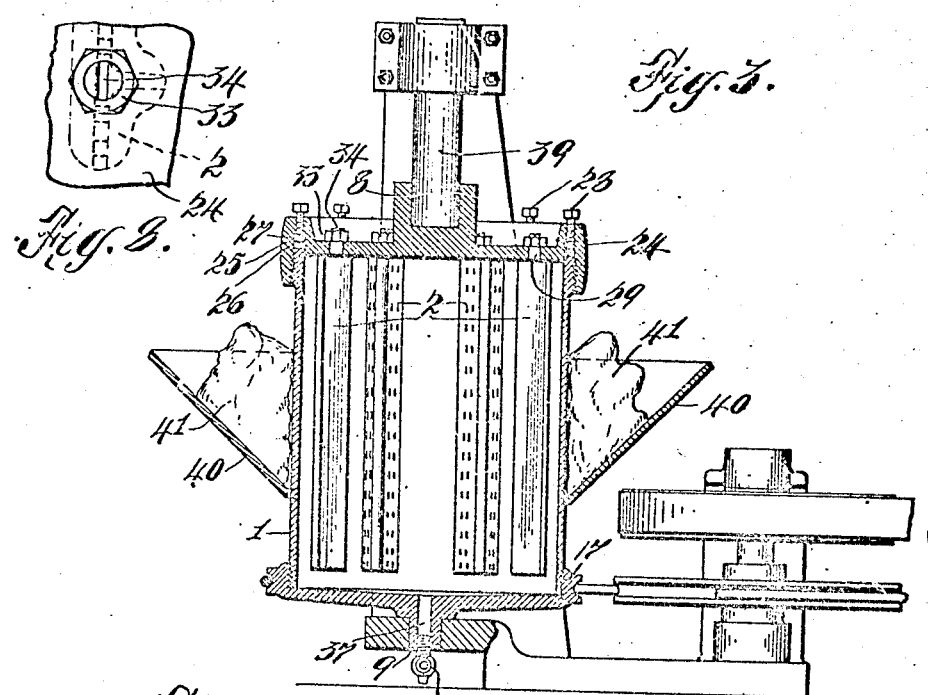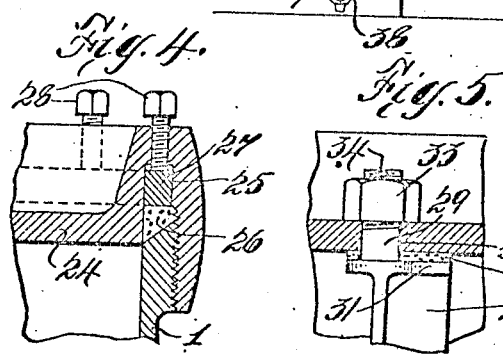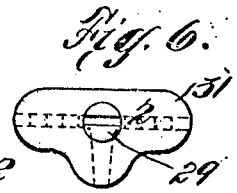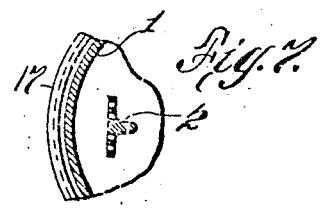

FREDERIC ECAUBERT, OF NEW YORK, N. Y.

MIXING OR SEPARATING MACHINE.

No. 895,173.

Specification of Letters Patent.

Patented Aug. 4, 1908.

Application filed October 8, 1906. Serial No. 337,945.

*To all whom it may concern:*

Be it known that I, FREDERIC ECAUBERT, a citizen of the United States of America, and a resident of the borough of Brooklyn, city of New York, county of Kings, State of New York, have invented certain new and useful Improvements in Mixing or Separating Machines, of which the following is a specification.

This invention relates to mixing or separating machines, and has for its main object a containing vessel adapted to act on or agitate the material contained therein by imparting motion to the vessel itself.

A further object resides in the fact that the containing vessel is devoid of interior moving parts.

Another object of the invention is to have an apparatus capable both of mixing and separating materials.

In carrying out the above objects, the invention comprises broadly: a containing vessel closed to radial escape of its contents, having suitable means for supporting it and transmission mechanism for imparting a combined planetary motion and rotation around its own axis to the said vessel.

The invention further consists in supporting means for rotatably mounting the vessel located wholly on the exterior thereof.

The invention further consists in an apparatus having a containing vessel closed to radial escape of its contents, suitably supported, and transmission mechanism for giving the vessel a combined planetary and rotating motion, or a rotating motion only.

Other features of construction, combination of parts, and arrangement of elements will appear as the specification proceeds.

In the drawings the invention is embodied in a concrete and preferred form but changes of construction may of course be made without departing from the legitimate and intended scope of the invention.

In the said drawings: Figure 1 is a view, partly in elevation and partly in section, of a machine embodying my invention. Fig. 2 is a sectional plan view on the line 2—2 of Fig. 1 showing also one of the containing vessels in section. Fig. 3 shows a modified structure for the purpose of separating substances only and the application of a refrigerant to facilitate the separation. Fig. 4 is a sectional detail view on an enlarged scale, showing the means for closing a vessel employed in the machine. Figs. 5, 6, 7 and 8 are detail views of one of the blades used in connection with my invention.

Similar characters of reference indicate corresponding parts in the different views.

1 indicates a containing vessel shown in the present instance in the form of a cylinder, but which may be of any shape desired or found useful. Within this vessel are the blades 2 which are fixed to the said vessel so as to follow its movement. These blades are here shown as perforated screens located adjacent to the periphery of the vessel. The vessel itself is closed to radial escape of its contents as will appear from an inspection of the drawings.

The above constitutes the entire mechanism which acts on the material, and by the driving mechanism hereinafter described, material placed within the vessel may be mixed or separated according to the motion imparted to the vessel.

Three different motions may be imparted to the vessel, viz:—a motion in a planetary orbit, a rotating motion around its own axis, and a combined planetary and rotating motion. The means for effecting these motions may be varied widely, but in the preferred construction disclosed particularly in Figs. 1 and 2 they assume the following form: 3 indicates a main shaft, which may be disposed horizontally or otherwise, but which is here shown in a vertical position, being suitably supported by the brackets 4 and 5.

Around the shaft may be grouped a number of containing vessels, of the character indicated, although, if it is desired to employ only one containing vessel, it can be done by balancing the device with a weight. These containing vessels are held by suitable supporting means comprising here two sets of radial arms 6 and 7, keyed to the shaft, and bearings, which are located wholly on the exterior thereof so that admission of grease or dirt within the vessel is avoided. These bearings may be of any construction desired, but a convenient and preferred form is disclosed in the drawings, where 8 indicates a bushing at one end of the vessel, and 9 denotes a stud at its other end. These bearings are adapted to coöperate with corresponding members on the radial arms, such as the stub shafts 10 and bearings 11. In this way the vessels will follow the movement of the main shaft, when the latter is rotated, and are also capable of an independent rotating motion around their own axes.

Motion may be imparted to the main shaft 3 by any suitable means, as the pulley 12, and the rotation of the main shaft will cause the vessels to move in a planetary path. Differential transmission for rotating the vessels around their own axes may be employed and could be operated from the main shaft 3. In this instance, however, it is preferred to impart an individual rotation to the said vessels by an independent pulley 13 mounted loosely on the shaft. This pulley can then be driven in either direction as the needs of the material may require, and the vessels thus rotated in either direction. Moving with this pulley 13 and fastened thereto is the pinion 14. Mounted loosely on the shaft is a sleeve 15 from which motion is transferred to the individual vessel by any suitable means such as the pulleys 16 and 17 and belt 18. Interposed between the said loose sleeve and the pulley 13 is suitable power transmission mechanism such as the two sets of gears 19 and 20 mounted on the shafts 21 carried by the upper radial arms 6. If motion is now imparted to the pulley 13 at a speed different from the speed of the shaft 3, an individual rotation of the vessels around their own axes will be effected. If motion is imparted to the pulley 13 at the same speed as the shaft 3 no individual rotation will take place. If the pulley 13 is held stationary as by the brake 22, the vessels will rotate around their own axes in the same general direction as the planetary path taken by the vessel. If the shaft 3 is rendered inoperative, as by throwing out the clutch 23, and the pulley 13 is operated, the vessels will be given a rotation around their own axes without any planetary motion.

The individual vessel is preferably constructed as follows:—24 indicates a cover in threaded engagement with one end of the vessel. This cover is provided with an annular recess 25 in which is located the packing ring 26 resting on the upper end of the vessel. Above this packing ring is a metallic ring 27. Bearing upon this metallic ring are a plurality of set screws 28. When the cover is placed on the vessel, it is not necessary to screw it down tightly, for by tightening the individual screws 28 a perfect sealing of the vessel can be obtained through the pressure brought to bear on the metallic ring 27 and by that distributed over the entire packing ring. The object of this is to avoid the great power which would have to be exerted if the cover as a whole is screwed down tightly.

The blades within the vessel are preferably suspended from the cover and removable therewith. In the construction here followed a threaded stem 29 is carried by the said blades extending up through the apertures 30 in the cover. At the point where the threaded stem rises from the blade the latter is provided with a support 31 on which is placed a packing ring 32. The threaded stem is engaged on the outside of the cover by the lock nut 33, and is provided with a kerf as 34 so that by applying a screw driver thereto, the blades may be adjusted inside of the vessel without removing the cover. The cover may further be provided with a filling hole 35 closed by the cap 36, and at the lower end of the vessel there may be an outlet 37 closed by the valve 38.

Taking one concrete instance of the use to which the invention may be put: If a fat, holding odors, is introduced into the vessel together with alcohol and if the speed of the main shaft is sufficiently great, the planetary motion imparted will cause the material to be thrown toward the perimeter of the planetary path. This will be clearly seen in Fig. 2. The blades within the vessel should during the mixing process be set radially. If a simultaneous rotation is now imparted to the vessel around its own axis, it will cause the blades to repeatedly shift the material from the perimeter of the planetary path.

After the material is thoroughly mingled, the planetary motion may cease, and the rotating motion of the vessel continue. By this means, separation will take place, the particles of fat being thrown toward the circumference of the vessel. If the blades are adjusted to the position indicated in Fig. 8, the fat particles will collect in an unbroken ring at the circumference of the vessel, and will tend to coagulate into a solid ring formation. This will leave the alcohol which has absorbed the odors, free. The said alcohol can now be drawn off through the valve 38, while the fat can be removed in solid portions from the vessel after removing the cover.

It is obvious that, if desired, the vessel can be removed from the machine after the materials are mingled, and placed on the rotating spindle 39 shown in Fig. 3 and there have its contents subjected to separation. If necessary or expedient, troughs as 40 holding ice as 41 can be located adjacent to the vessel while rotating thereby producing or facilitating the coagulation of the fat.

What I claim is:

1. In a mixing or separating machine, the combination with a containing vessel closed to radial escape of its contents, of means for supporting the said vessel, and transmission mechanism for imparting a combined planetary motion and rotation around its own axis to the said vessel.

2. In a mixing or separating machine, the combination with a containing vessel closed to radial escape of its contents, of means for supporting the said vessel, means for imparting a planetary motion to the vessel at a sufficient speed to cause its contents to be thrown toward the periphery of the planetary path of the vessel, and means for simultaneously therewith imparting a rotation around its own axis to the vessel whereby its contents is shifted away from the periphery of the planetary path of the vessel.

3. In a mixing or separating machine, the combination with a containing vessel closed to radial escape of its contents and having interior blades secured thereto, of means for supporting the said vessel, and transmission mechanism for imparting a combined planetary motion and rotation around its own axis to the said vessel.

4. In a mixing or separating machine, the combination with a containing vessel closed to radial escape of its contents and having interior blades secured thereto, of means for supporting the said vessel, means for imparting a planetary motion to the vessel at a sufficient speed to cause its contents to be thrown toward the periphery of the planetary path of the vessel, and means for simultaneously therewith imparting a rotation around its own axis to the vessel whereby its contents is shifted away from the periphery of the planetary path of the vessel.

5. In a mixing or separating apparatus, the combination with a containing vessel closed to radial escape of its contents, of means for supporting the said vessel, and transmission mechanism adapted to impart a combined planetary motion and rotation around its own axis to the said vessel, and also adapted to impart a rotation around its own axis only to the said vessel.

6. In a mixing or separating apparatus, the combination with a containing vessel closed to radial escape of its contents and provided with adjustable blades adapted to be arranged radially or circumferentially to the periphery of the vessel, of means for supporting the said vessel, and transmission mechanism adapted to impart a combined planetary motion and rotation around its own axis to the said vessel, and also adapted to impart a rotation around its own axis only to the said vessel.

7. In a mixing or separating machine, the combination with a containing vessel closed to radial escape of its contents, of means for supporting said vessel, and transmission mechanism adapted to impart a combined planetary motion and a rotation around its own axis to the vessel, and also adapted to impart each of said motions, one independently of the other, to the said vessel.

8. In a mixing or separating machine, the combination with a vessel closed to radial escape of its contents and rotatably mounted on supporting means located wholly on the exterior of the vessel, of transmission mechanism for imparting a combined planetary motion and rotation around its own axis to the vessel.

9. In a mixing or separating machine, the combination with a containing vessel closed to radial escape of its contents and provided with interior blades adapted to follow the movement of the vessel, of supporting means rotatably mounting the vessel and located wholly on the exterior thereof, and means for rotating the vessel on its supporting means.

10. In a mixing or separating apparatus, the combination with a vessel closed to radial escape of its contents, of exteriorly adjustable blades extending through said vessel to the interior thereof and adapted to follow the motion of the vessel, means for supporting the said vessel, and transmission mechanism adapted to impart a combined planetary motion and rotation around its own axis to the said vessel, and also adapted to impart a rotation around its own axis only to the said vessel.

11. In a mixing or separating machine, the combination with a containing vessel closed to radial escape of its contents, of blades, within the said vessel and adapted to follow its movement, set radially so as to form obstructions to the contents of the vessel when mixing, and means for adjusting the said blades so as to permit a constituent portion of the contents of the vessel to collect in an unbroken ring when separating.

12. In a mixing or separating machine, the combination with a containing vessel closed to radial escape of its contents, of blades, within the said vessel and adapted to follow its movement, set radially so as to form obstructions to the contents of the vessel when mixing, and means, extending to the exterior of the vessel, for adjusting the said blades so as to permit a constituent portion of the contents of the vessel to collect in an unbroken ring when separating.

Signed at New York city this 27 day of September 1906.

FREDERIC ECAUBERT.

Witnesses:
AXEL V. BEEKEN,
GEO. A. MARSHALL.